United States Patent
Koike et al.

(10) Patent No.: US 7,021,412 B2
(45) Date of Patent: Apr. 4, 2006

(54) STRUCTURE FOR MOUNTING BOX FOR CONTAINING HIGH-VOLTAGE ELECTRICAL EQUIPMENT ON VEHICLE

(75) Inventors: Hirotomo Koike, Wako (JP); Harumi Takedomi, Wako (JP)

(73) Assignee: Honda Giken Kogyo Kabushiki Kaisha, Osaka (JP)

( * ) Notice: Subject to any disclaimer, the term of this patent is extended or adjusted under 35 U.S.C. 154(b) by 98 days.

(21) Appl. No.: 10/290,970

(22) Filed: Nov. 8, 2002

(65) Prior Publication Data

US 2003/0089540 A1 May 15, 2003

(30) Foreign Application Priority Data

Nov. 15, 2001 (JP) ............................. 2001-350700

(51) Int. Cl.
*B60K 1/04* (2006.01)
(52) U.S. Cl. .................................................. 180/68.5
(58) Field of Classification Search ............... 180/65.1, 180/68.5, 291; 280/781, 783; 429/100
See application file for complete search history.

(56) References Cited

U.S. PATENT DOCUMENTS

| | | | | |
|---|---|---|---|---|
| 4,317,497 A | * | 3/1982 | Alt et al. .................... | 180/68.5 |
| 4,365,681 A | * | 12/1982 | Singh ......................... | 180/68.5 |
| 5,853,058 A | * | 12/1998 | Endo et al. ................. | 180/65.1 |
| 5,855,394 A | * | 1/1999 | Horton et al. .............. | 280/781 |
| 6,220,380 B1 | * | 4/2001 | Mita et al. .................. | 180/65.1 |
| 6,220,383 B1 | * | 4/2001 | Muraki et al. .............. | 180/68.5 |
| 6,227,322 B1 | * | 5/2001 | Nishikawa .................. | 180/68.5 |
| 6,472,098 B1 | * | 10/2002 | Sawada et al. ............. | 429/100 |
| 2001/0030069 A1 | * | 10/2001 | Misu et al. ................. | 180/68.1 |
| 2001/0052433 A1 | * | 12/2001 | Harris et al. ............... | 180/68.5 |
| 2005/0039964 A1 | * | 2/2005 | Goyry ........................ | 180/68.5 |

FOREIGN PATENT DOCUMENTS

| | | |
|---|---|---|
| GB | 2 130 153 | 5/1984 |
| JP | 7-117489 | 5/1995 |
| JP | 9-290650 | 11/1997 |
| JP | 10-255746 | 9/1998 |
| JP | 2001-113959 | 4/2001 |

* cited by examiner

*Primary Examiner*—Frank Vanaman
(74) *Attorney, Agent, or Firm*—Hamre, Schumann, Mueller & Larson, P.C.

(57) ABSTRACT

A structure for mounting a box for containing high-voltage electrical equipment on a vehicle, so as to suppress increase in the number of parts, the weight of the vehicle, and the manufacturing cost by effectively using existing structural members of the vehicle body. The structure includes a frame member which is attached to the box and which extends to the rear side of the vehicle, and the frame member is combined with side frames which are structural members of the body of the vehicle. Typically, The frame member consists of two frame members which are respectively attached to the side frames at the right and left sides, and the structure further comprises a cross beam for coupling the frame members with each other, wherein the cross beam extends in the width direction of the vehicle.

9 Claims, 7 Drawing Sheets

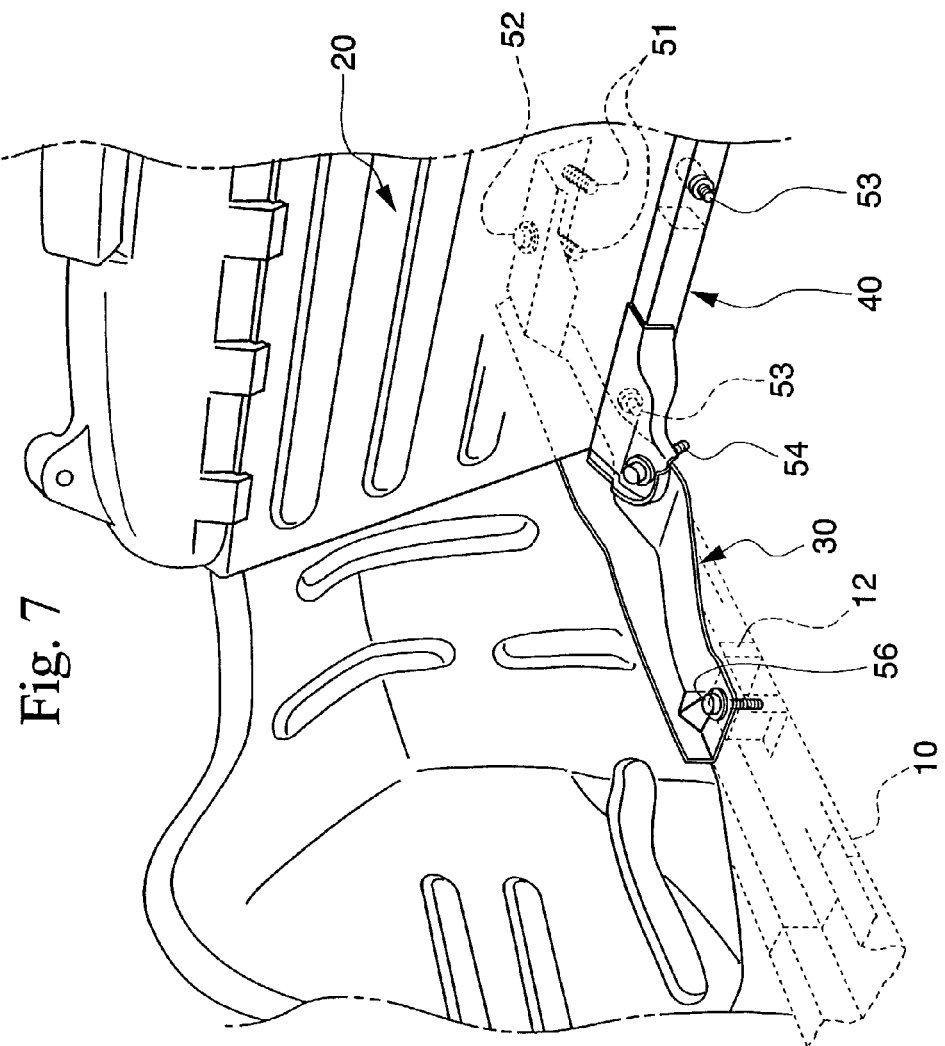

STRUCTURE FOR MOUNTING BOX FOR CONTAINING HIGH-VOLTAGE ELECTRICAL EQUIPMENT ON VEHICLE

BACKGROUND OF THE INVENTION

1. Field of the Invention

The present invention relates to a structure for mounting a box for containing high-voltage electrical equipment on a hybrid vehicle or the like, and in particular, relates to a structure for improving the rigidity of the portion to which the box is attached.

2. Description of the Related Art

Conventionally, vehicles (such as hybrid vehicles) are known in which the output of the engine is assisted by driving a motor and in which the motor is used as a generator for regenerating electrical power during deceleration. In order to drive the motor, high-voltage electrical components contained in a box for containing high-voltage electrical equipment or the like are necessary. Among the high-voltage electrical components, an inverter, battery, and the like are heavy; thus, the portion to which these heavy components are attached should have high rigidity to support the components.

However, if attachment members having rigidity sufficient for supporting the high-voltage electrical components are provided on the vehicle body, the number of parts and the weight of the vehicle are increased, thereby increasing the manufacturing cost. In order to solve this problem, a novel vehicle structure for reliably supporting the high-voltage electrical components may be employed. However, currently, the same vehicle body structure is used on different vehicles, and the above employment of a novel vehicle structure conflicts with this trend.

SUMMARY OF THE INVENTION

In consideration of the above circumstances, an object of the present invention is to provide a structure for mounting a box for containing high-voltage electrical equipment on a vehicle, so as to suppress increase in the number of parts, the weight of the vehicle, and the manufacturing cost by effectively using existing structural members of the vehicle body.

Therefore, the present invention provides a structure for mounting a box for containing high-voltage electrical equipment (e.g., a box 20 for high-voltage electrical equipment in an embodiment explained below) on a vehicle, comprising:

a frame member (e.g., a frame member 30 in the embodiment explained below) which is attached to the box and which extends to the rear side of the vehicle, wherein the frame member is combined with side frames (e.g., side frames 10 in the embodiment explained below) which are structural members of the body of the vehicle.

According to the above structure, the box for high-voltage electrical equipment can be supported via the frame member which extends to the rear side of the vehicle, by the side frames at the right and left sides of the vehicle, which are structural members of the body of the vehicle. If a vehicle which is behind bumps the rear face of the present vehicle and crashes into the present vehicle, the crashing vehicle can be blocked by the rear end of the frame member. Therefore, the safety when the vehicle which is behind bumps the present vehicle can be improved, thereby reliably protecting the high-voltage electrical components.

In addition, the rigidity of the portions, to which the heavy box for high-voltage electrical equipment is attached, can be improved by effectively using the existing structural members of the body of the vehicle. Therefore, increases in the number of parts and in the weight of the vehicle are prevented, and the manufacturing cost can be reduced without newly providing a specified portion to which the box 20 is attached. In addition, such effective use of the existing structural members improves the trend of the common use of the structure of the vehicle body.

As a typical example, the frame members are provided at the right and left sides of the vehicle.

The above structure may further comprise a cross member (e.g., a cross member 11 in the embodiment explained below) combined with a front portion of the frame member, wherein the cross member is a structural member of the body of the vehicle and extends between the side frames and in the width direction of the vehicle.

According to this structure, the box for high-voltage electrical equipment is supported not only by the side frames, but also by the cross member which is also a structural member of the body of the vehicle. Therefore, the weight of the box can be dispersively supported in the front to rear direction of the vehicle, and the weight of the box can also be dispersively supported along the width direction of the vehicle by the cross member. Therefore, the rigidity of the portions to which the box is attached can be further improved.

The side frames and the cross member may be each combined with a floor panel of the vehicle.

As a typical example, the frame member consists of two frame members which are respectively attached to the side frames at the right and left sides; and the structure for mounting the box may further comprise a cross beam (e.g., a cross beam 40 in the embodiment explained below) for coupling the frame members with each other, wherein the cross beam extends in the width direction of the vehicle.

According to this structure, the frame members at the right and left sides for supporting the box for high-voltage electrical equipment can be coupled with each other. Therefore, the rigidity of the portions to which the box for high-voltage electrical equipment is attached can be further improved by the coupled frame members.

The front portion of the box may be supported by the cross member and the rear portion of the box may be supported by the cross beam.

As a typical example, the box contains high-voltage electrical components which are directly attached to at least one of structural members of the body of the vehicle. The high-voltage electrical components may include a battery box which contains a battery, or a heat sink case which contains at least one of an inverter, a DC/DC converter, and an electrical control unit.

Typically, the vehicle is a hybrid vehicle.

BRIEF DESCRIPTION OF THE DRAWINGS

FIG. 7 is a perspective view which is viewed from the rear side of the interior of the vehicle in the embodiment."

DESCRIPTION OF THE PREFERRED EMBODIMENTS

Hereinafter, an embodiment according to the present invention will be explained with reference to the drawings. The vehicle in this embodiment has an ordinary structure in which (i) panel components such as a floor panel 2 and (ii) framework components such as a side frame 10 and a cross member 11 are combined.

Figure 1:
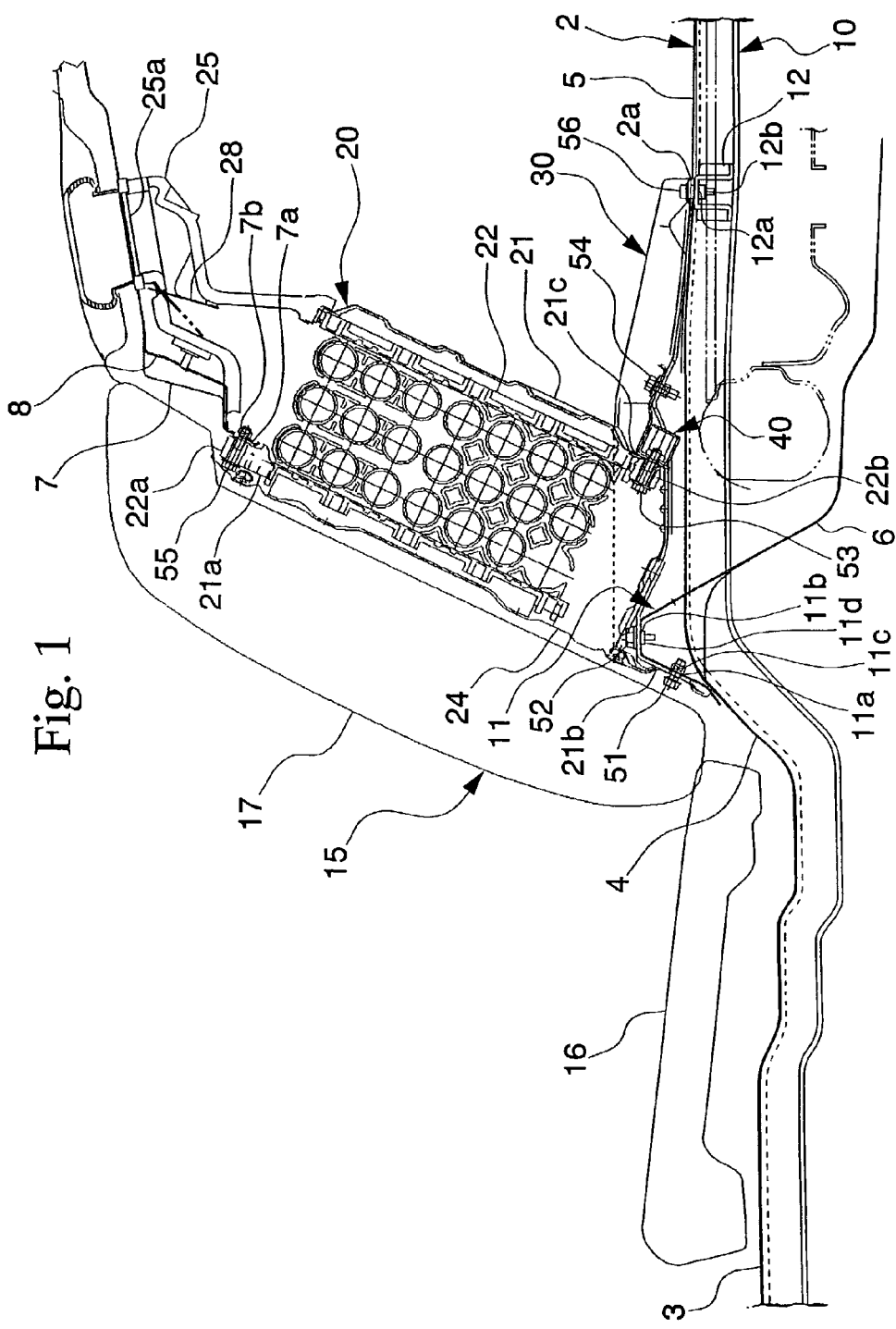
FIG. 1 is a partial side view of a vehicle for explaining an embodiment according to the present invention.

As shown in FIG. 1, the floor panel 2 provides a floor surface 3 of the (passenger) interior of the vehicle and a floor surface 5 of the luggage compartment, where a step portion 4 is formed between the floor surfaces 3 and 5. In a central area of the floor surface 5 of the luggage compartment, a container 6 for storing a spare tire is provided, which protrudes downward.

At either side of the floor panel 2, a side frame 10 is welded to the back face of the floor panel in a manner such that the side frame 10 extends from the front to the rear side of the panel. Accordingly, the side frames 10 and the floor panel 2 form a closed-section structure.

A bracket 12 is welded to the inside of the side frame 10 (see FIG. 7), where the position of the bracket 12 corresponds to the rear end of a frame member 30 which will be explained in detail below. The top face of the bracket 12 contacts the back face of the floor panel 2 and has an attachment hole 12a through which a bolt 56 is inserted. A nut 12b is engaged with the bolt 56 from the back side of this position. In addition, a relief hole 2a for the bolt 56 is provided at the corresponding position of the floor panel 2. In FIG. 1, the frame member 30 at the right side of the vehicle is shown.

Additionally, a cross member 11 is welded to the upper face of the step portion 4 of the floor panel 2 in a manner such that the cross member 11 extends between the side frames 10 in the width direction of the vehicle. The cross member 11 and the floor panel 2 also form a closed-section structure.

Accordingly, the above two closed-section structures are coupled with each other, so as to form the basic frame of the vehicle.

The cross member 11 has a trapezoidal section. In the front inclined face of the member 11, two attachment holes 11a, through which a pair of bolts 51 are inserted (refer to FIG. 7), are formed at a position corresponding to the frame member 30, and nuts 11c are engaged with the bolts 51 from the back face side. In addition, in the top face of the cross member 11, an attachment hole 11b through which a bolt 52 is inserted is provided, and a nut 11d is engaged with the bolt 52 from the back face side.

A rear seat 15 is provided on the rear portion of the floor surface 3 (of the interior) of the floor panel 2. This rear seat 15 consists of a main body 16 and a backrest 17. The main body 16 is attached to the floor panel 2 via a seat frame (not shown). The lower portion and the upper portion of the backrest 17 are respectively attached to the cross member 11 and the rear tray 7 (which is supported by a reinforcing member 8) via hooks (not shown) or the like.

The rear tray 7 and the reinforcing member 8 have attachment holes 7a, through which bolts 55 are inserted, and nuts 7b are engaged with the bolts 55 from the back side, where the holes 7a are positioned above the front face of a box 20 for containing high-voltage electrical equipment.

The above box 20 for high-voltage electrical equipment is provided at the back face of the backrest 17, where the box 20 is slightly inclined to the rear side of the vehicle so as to conform with the back face of the inclined backrest 17. The box 20 has an armor box 21 in which a battery box 22 is contained at the left side and a heat sink case 23 is contained at the right side, and the armor box is closed by a cover 24 laid from the front side. A battery, which is a high-voltage electrical component, is contained in the battery box 22, and an inverter, a DC/DC converter, an ECU (electronic control unit), and the like, which are also high-voltage electrical components, are attached to (the inside of) the heat sink case 23.

Each of the battery box 22 and the heat sink case 23 has two fastening arms 22a which extend from the upper side of the front face, and two fastening arms 22b which extend from the lower side of the rear face.

The armor box 21 has (i) an upper flange 21a which is fastened to the rear tray 7 and the reinforcing member 8 and (ii) a lower flange 21b which is fastened to the cross member 11. The armor box 21 also has four attachment holes 21c through which bolts 53 are inserted, where these holes face a cross beam (explained below).

Figure 2:
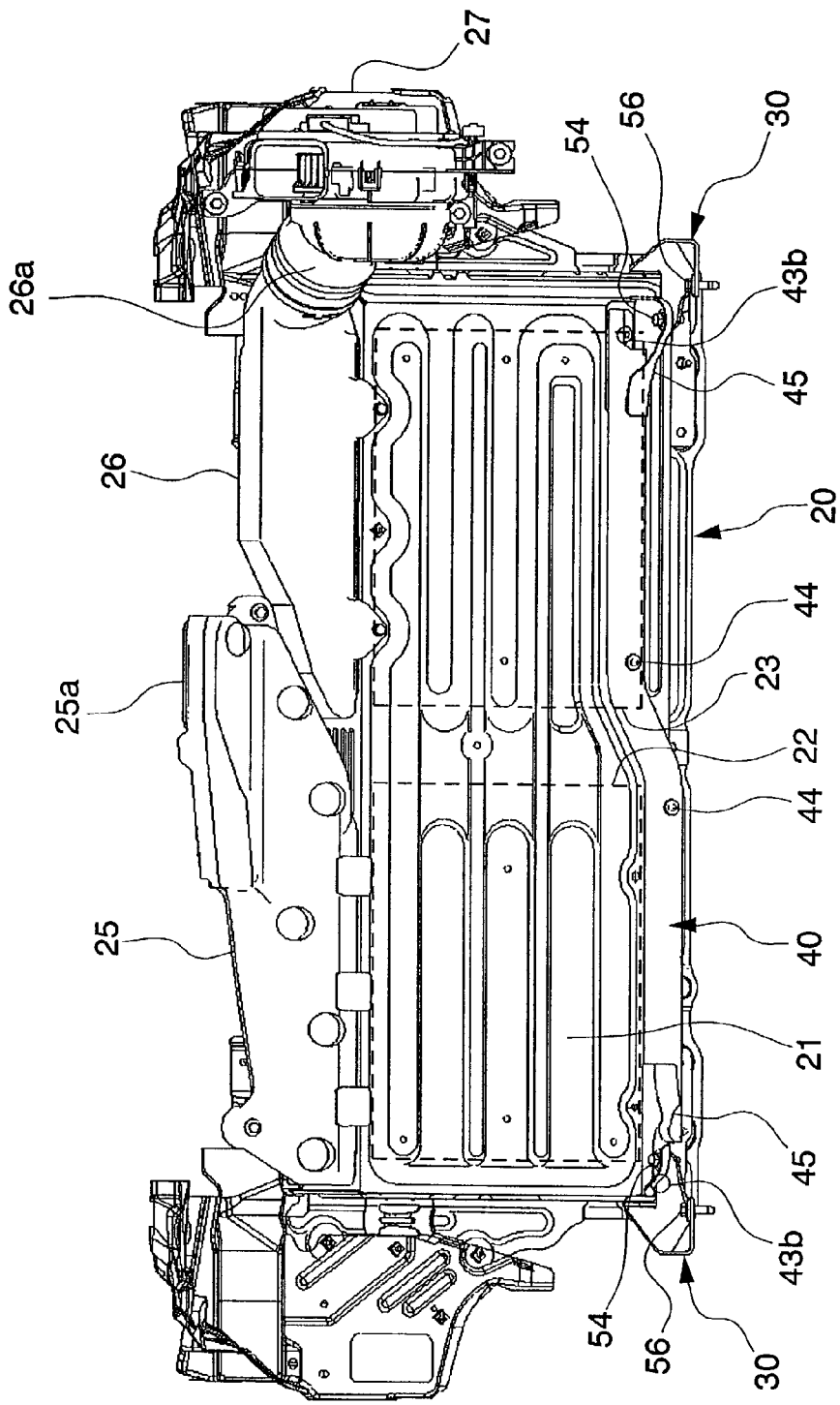
FIG. 2 is a rear view of the box for high-voltage electrical equipment, and relevant elements in embodiment.

FIG. 2 is a rear view of the box 20 for high-voltage electrical equipment, and the like. As shown in the figure, an intake duct 25 and a discharge duct 26 are attached to the upper side of the armor box 21 so as to cool the inside of the box 21. A fan 27 is attached to the outlet 26a of the discharge duct 26 and the inlet 25a of the intake duct 25 is positioned in the (passenger) interior of the vehicle. When the fan 27 is operated, a shutter 28 in FIG. 1 is open, so that the air in the interior is drawn into the armor box 21, thereby cooling the high-voltage electrical components in the box.

At both sides of the lower portion of the box 20 for high-voltage electrical equipment, the frame members 30 are attached, which extend from the box 20 towards the rear side of the vehicle. The cross beam 40 extending in the width direction of the vehicle is attached to the lower portion of the rear face of the box 20. The frame members 30 are coupled with each other via the cross beam 40.

Figure 3:
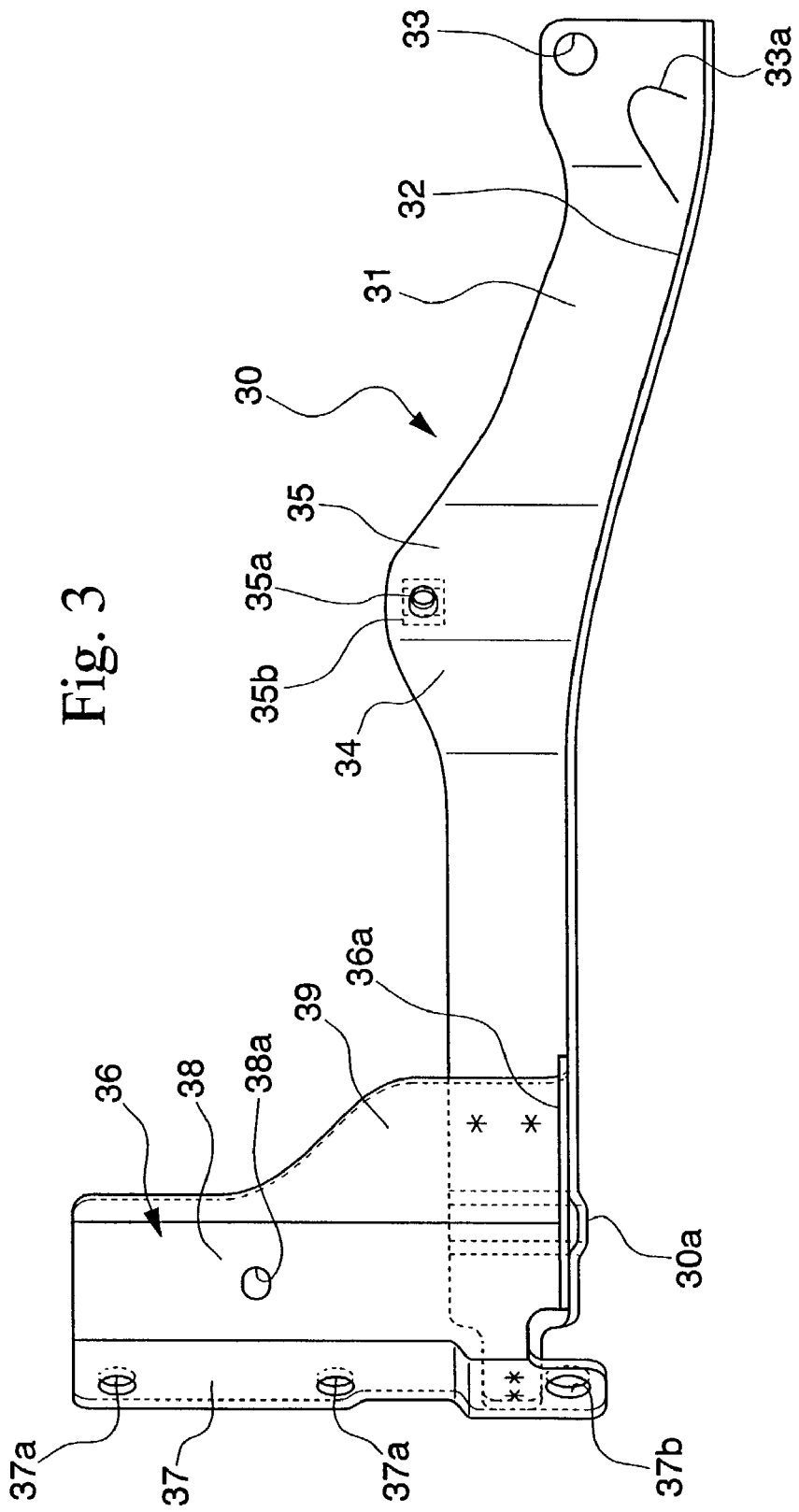
FIG. 3 is a top view of the frame member provided at the left side of the vehicle in the embodiment.
Figure 4:
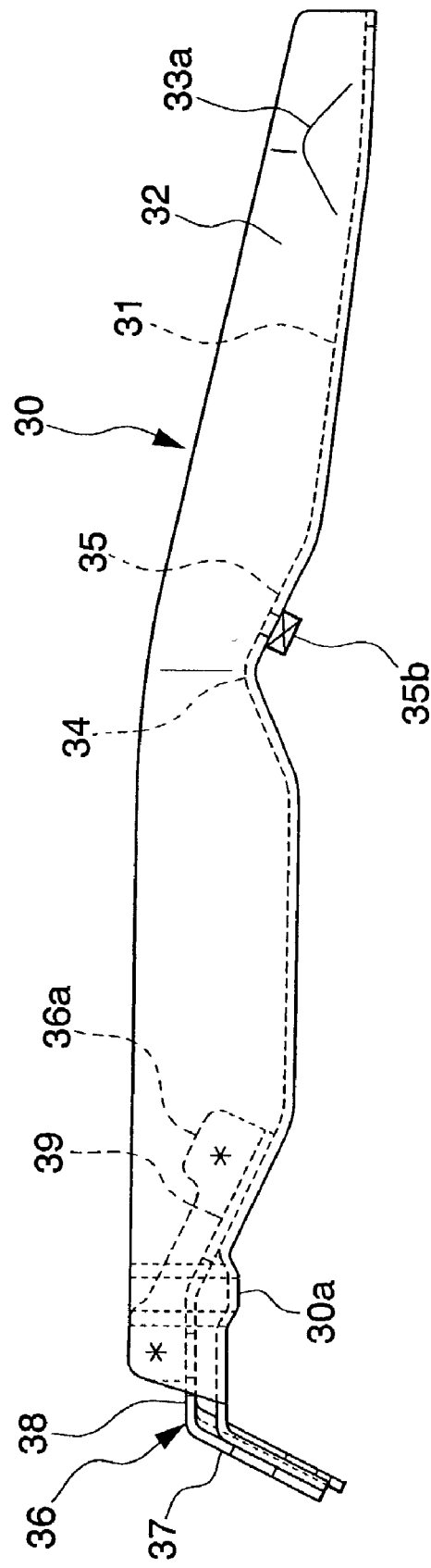
FIG. 4 is a side view of the frame member in FIG. 3.

FIG. 3 is a top view of the frame member 30 provided at the left side of the vehicle, and FIG. 4 is a side view of this frame member 30. The frame member 30 provided at the right side has a mirror-image structure with respect to the frame member 30 at the left side; thus, the frame member 30 at the right side is shown only in FIGS. 1 and 2, and the detailed structure thereof is omitted here.

In FIGS. 3 and 4, the frame member 30 is formed by press molding and has a plane portion 31 and a vertical flange 32 which extends outside the interior of the vehicle. The plane portion 31 and the vertical flange 32 form an "L" section by which necessary rigidity can be secured. The frame member 30 extends from the lower portion of the box 20 (for high-voltage electrical equipment) to the bracket 12 which is welded to the side frame 10.

At the front end of the frame member 30, the plane portion 31 has an extension provided inside the interior of the vehicle, which is a trapezoidal portion 36 having a trapezoidal section (see FIG. 4). In the present embodiment, the trapezoidal portion 36 is a separate portion which is spot-welded to the plane portion 31 in a manner such that the trapezoidal portion 36 and the plane portion 31 partially overlap each other. Additionally, the trapezoidal portion 36 has a flange portion 36a which is also spot-welded to the vertical flange 32 so that the flange portion 36a contacts the vertical flange 32.

In the front inclined face 37 of the trapezoidal portion 36, a pair of attachment holes 37a, through which the bolts 51 are inserted, are formed, where the positions of the holes 37a correspond to those of the above-explained holes 11a of the cross member 11. In FIG. 3, reference numeral 37b indicates a relief hole for an attachment jig, which is positioned outside the passenger interior of the vehicle.

In the top face 38 of the trapezoidal portion 36, an attachment hole 38a through which the bolt 52 is inserted is formed, where the position of the hole 38a 36 corresponds to that of the above-explained hole 11b of the cross member 11.

In addition, a bead 30a is formed from the plane portion 31 to the vertical flange 32, at the position where trapezoidal portion 36 is attached. In addition, the width of the rear inclined face 39 of the trapezoidal portion 36 varies in a manner such that the side which is attached to the vertical flange 36a has a larger width. Accordingly, the rigidity of the plane portion 31 having an extension (i.e., the trapezoidal portion 36) towards the inside of the interior of the vehicle is improved.

The plane portion 31 also has a wider portion protruding towards the inside of the interior, which is positioned at approximately the center of the frame member 30 in the longitudinal direction, and this wider portion simultaneously forms a peak-form (or an angle) portion 34 (see FIG. 4) whose section has a peak shape.

In the rear inclined face of the peak-form portion 34, an attachment hole 35a, through which the bolt 54 is inserted, is formed, where the position of the hole 35a corresponds to the position of the cross beam 40 (explained below), and a nut 35b is engaged with the bolt 35a from the back face side.

At the rear end of the frame member 30, the plane portion 31 also has a wider portion slightly protruding towards the inside of the passenger interior. In this wider portion, an attachment hole 33 through which the bolt 56 is inserted is formed, where the position of the hole 33 corresponds to that of the bracket 12 which is welded to the side frame 10. In this wider portion, at the opposite side of the hole 33, a triangle bead 33a is formed so as to improve the rigidity (refer to FIGS. 4 and 7).

As explained above, the frame member 30 consists of two parts which include the spot-welded trapezoidal portion 36. However, these parts may be formed as an integral form.

Figure 5:
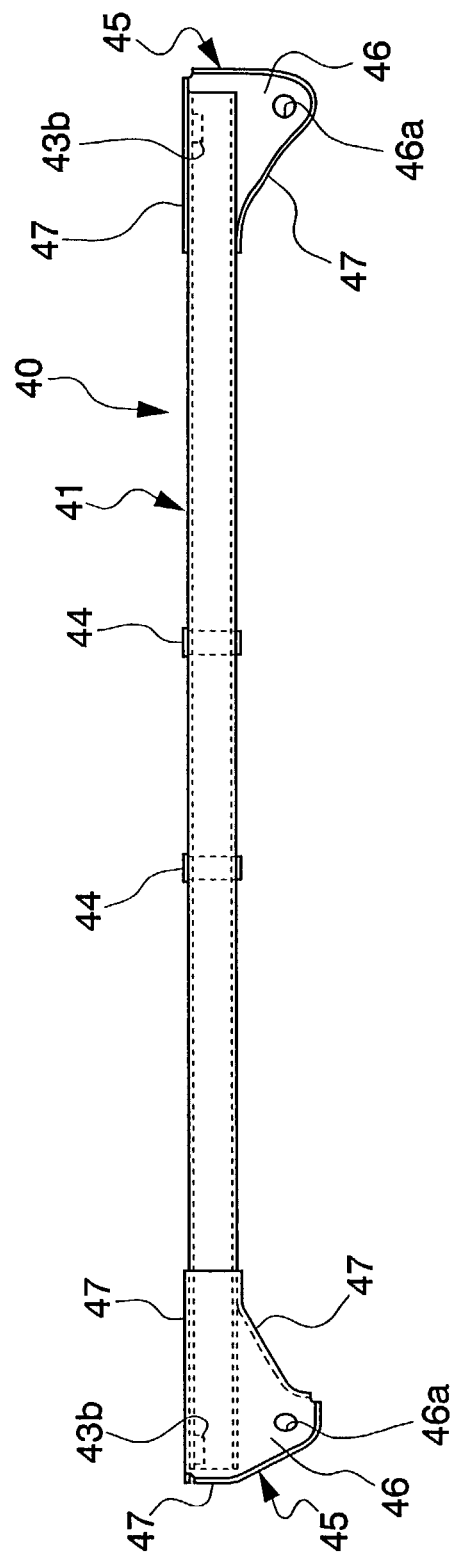
FIG. 5 is a top view of the cross beam in the embodiment.
Figure 6:
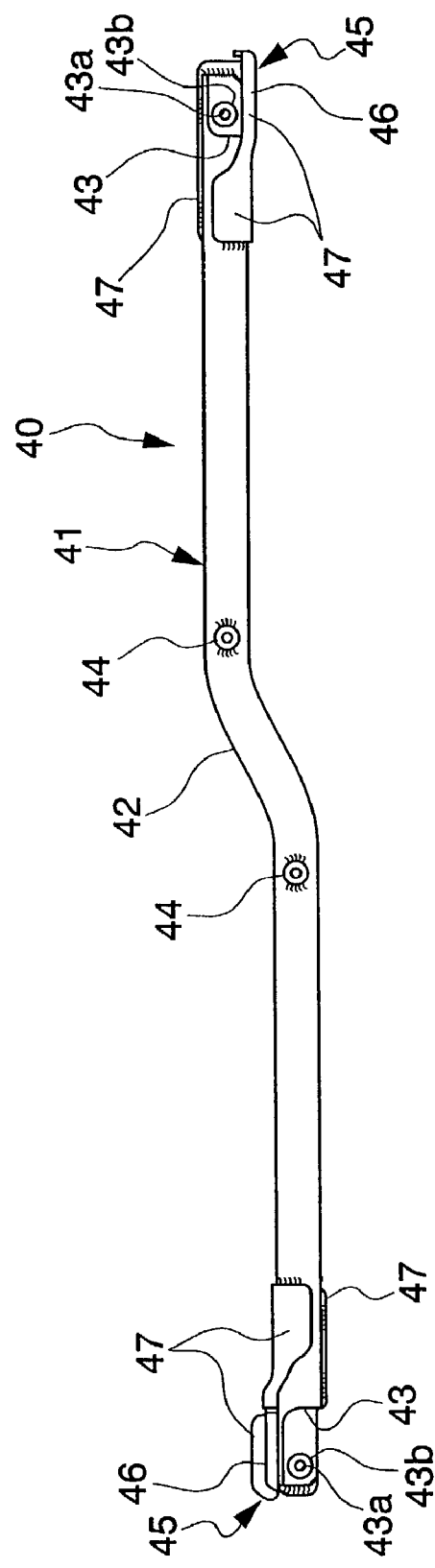
FIG. 6 is a side view of the cross beam in FIG. 5.

FIG. 5 is a top view of the cross beam 40, FIG. 6 is a side view of the cross beam 40, and FIG. 7 is a perspective view showing the attached cross beam 40.

As shown in FIGS. 5 to 7, the cross beam 40 consists of (i) a main body 41 made of a square steel pipe and (ii) brackets 45 which are attached to both sides of the main body 41 and are made by press molding. The cross beam 40, extending along the width direction of the vehicle, is attached to the lower portion of the rear face of the box 20 for high-voltage electrical equipment, and the cross beam 40 is combined with the frame members 30.

The main body 41 has a step portion 42 (see FIG. 6) at a center portion in the width direction of the vehicle, so that the right side is higher and the left side is lower.

At both ends of the front face of the main body 41 of the beam, attachment holes 43a, through which the attachment bolts 53 are inserted, are formed, where the positions of the holes 43a correspond to the attachment holes 21c of the box 20 (two of the four holes 21c), and bosses 43b are attached to the corresponding positions at the back face side (see FIG. 5). In FIG. 6, reference numerals 43 indicates cut portions formed by partially removing the rear and bottom faces of the main body 41 of the beam.

In addition, bosses 44, through which the bolts 53 are inserted, are provided through the main body 41 of the beam, that is, from the front to the rear face of the main body. The positions of the bosses 44 correspond to the remaining two attachment holes 21c of the box 20, and the step portion is positioned between the bosses 44.

One of the brackets 45 is attached to the top face of the left end of the main body 41, and the other is attached to the bottom face of the right end of the main body 41. The plane portion 46 of each bracket 45 extends towards the rear side of the vehicle, and the heights of the plane portions 46 of both brackets coincide with each other, which compensates the difference between the heights of the right and left sides of the step portion 42, so that the frame members 30 at the right and left sides are attached to the plane portions 46 having the same height. That is, in the rear end of each plane portion 46, an attachment hole 46a through which the bolt 54 is inserted is formed, where the position of the hole 46a coincides with the position of the attachment hole 35a of the corresponding frame member 30.

In the plane portion 46, vertical flanges 47 are provided, which function as a part of the front and rear faces of the main body 41 of the beam, and the rigidity of the bracket 45 is improved by the three faces of the vertical flanges 47 and the plane portion 46, and the three faces are partially welded to the main body 41 of the beam.

According to the above embodiment, the box 20 for high-voltage electrical equipment is supported, via the frame members 30 (at the right and left sides) extending towards the rear side of the vehicle, by the side frames 10 at the right and left sides and the cross member 11, which are components for constituting the basic structure of the vehicle. Therefore, the weight of the box 20 can be dispersively supported in the front to rear direction of the vehicle, and the weight of the box 20 can also be dispersively supported along the width direction of the vehicle by the cross member 11. Therefore, the rigidity of the portions to which the box 20 is attached can be improved.

In particular, the battery box 22 and the heat sink case 23 themselves in the box 20 are directly fastened to the structural members of the vehicle; thus, the box 20 for high-voltage electrical equipment can be further reliably attached to the vehicle.

As explained above, the existing structural members of the vehicle are effectively used without newly providing a specified portion to which the box 20 is attached. Therefore, increases in the number of parts and in the weight of the vehicle are prevented, and the manufacturing cost can be reduced. In addition, such effective use of the existing structural members improves the trend of the common use of the structure of the vehicle body.

Furthermore, the frame members 30 at the right and left sides can be coupled with each other via the cross beam 40, thereby further improving the rigidity of the portion to which the box 20 is attached.

If a vehicle which is behind bumps the rear face of the present vehicle, and the vehicle which is behind crashes into the present vehicle, the crashing vehicle can be blocked by the rear ends of the frame members 30; thus, the box 20 for high-voltage electrical equipment can be reliably protected.

The present invention is not limited to the above-explained embodiment. For example, the frame members 30 at the right and left sides may be formed as an integrated frame member. In addition, the members which are combined using bolts may be combined by welding.

The frame member 30 is not limited to a press-molded steel which has an "L" section shape, but may be made of another material and may have another section shape if the necessary strength and rigidity can be secured. For example, an aluminum square bar may be used.

Similarly, the sectional shape and the material of the cross beam 40 may also be flexibly determined.

What is claimed is:

1. A structure for mounting a box for containing high-voltage electrical equipment on a vehicle having a rear seat backrest being inclined, at the top thereof, toward the rear of the vehicle, the structure comprising:
   frame members which are respectively attached to right and left bottom portions of the box while extending from front portions of the box to further rear positions with respect to the top of the box, each of the frame members having an L-shaved transverse cross-section and fixed to the box at front and rear ends of the box;
   side frames constituting a portion of structural members of the vehicle, to which the frame members are fixed; and
   a cross member connected to front portions of the frame members, the cross member being a structural member of the vehicle and extending between the side frames and in the width direction of the vehicle while projecting in an upward direction of the vehicle so as to support the box in an inclined manner behind and along the rear seat backrest.

2. A structure as claimed in claim 1, wherein the frame members are provided at the right and left sides of the vehicle.

3. A structure as claimed in claim 1, wherein the side frames and the cross member are each connected to a floor panel of the vehicle.

4. A structure as claimed in claim 1, further comprising:
   a cross beam for coupling the frame members with each other, wherein the cross beam extends in the width direction of the vehicle.

5. A structure as claimed in claim 1, further comprising a cross beam extending in the width direction of the vehicle for coupling the frame members with each other, wherein the front portion of the box is supported by the cross member and the rear portion of the box is supported by the cross beam.

6. A structure as claimed in claim 1, wherein the vehicle is a hybrid vehicle.

7. A structure as claimed in claim 1, wherein the frame members extend longitudinally generally parallel to the side frames.

8. A structure as claimed in claim 1, wherein an end of each frame member is connected to the cross member, and an opposite end of each frame member is connected to a respective one of the side frames at a location to the rear of the box.

9. A structure as claimed in claim 1, wherein the L-shaped transverse cross-section of each frame member comprises a plane portion that extends in the width direction of the vehicle and a vertical flange that is generally orthogonal to the plane portion and extends generally vertically upward from the plane portion.

* * * * *